United States Patent [19]

Tecco

[11] Patent Number: 4,907,666
[45] Date of Patent: Mar. 13, 1990

[54] INTEGRAL EXHAUST PIPE AND BRACKET FOR TRUCKS

[75] Inventor: Thomas C. Tecco, Fort Wayne, Ind.

[73] Assignee: Navistar International Transportation Corp., Chicago, Ill.

[21] Appl. No.: 259,062

[22] Filed: Oct. 18, 1988

[51] Int. Cl.⁴ .............................................. B60K 13/06
[52] U.S. Cl. ..................................... 180/89.2; 180/309
[58] Field of Search ............... 180/309, 89.2; 181/227, 181/243

[56] References Cited

U.S. PATENT DOCUMENTS

| | | | |
|---|---|---|---|
| 2,429,732 | 10/1947 | Roos | 123/1 R |
| 3,907,057 | 9/1975 | Reddekopp | 180/64 A |
| 3,908,368 | 9/1975 | Witt | 60/280 |
| 4,060,143 | 11/1977 | Matsumoto et al. | 180/64 A |
| 4,378,945 | 4/1983 | Trautman | 277/200 |

OTHER PUBLICATIONS

"1600-2600 Series: Medium & Heavy Conventional Features and Specifications," No. CT-476D, Aug., 1987, Navistor International Transportation Corp., pp. 7-1 to 7-6 and Front & Rear Covers.

Primary Examiner—Charles A. Marmor
Assistant Examiner—Tamara L. Finlay
Attorney, Agent, or Firm—F. David AuBuchon; Dennis K. Sullivan

[57] ABSTRACT

An integral exhaust pipe and mounting bracket for use with the engine exhaust system of medium or heavy duty trucks which have a structural framework. A mounting plate is secured to one end of the exhaust pipe and mounted to the structural framework of the truck. The opposite end of the exhaust pipe is oriented generally vertically generally parallel to the wall of the truck cab but otherwise free standing. A lateral brace bridges the mounting plate and the opposite end and is secured therebetween. The exhaust pipe, mounting plate and lateral brace complete the integral mounting bracket with the exhaust pipe being utilized as a structural member instead of being a nonstructural mass attached to a bracket and supported as a dead weight thereon.

26 Claims, 4 Drawing Sheets

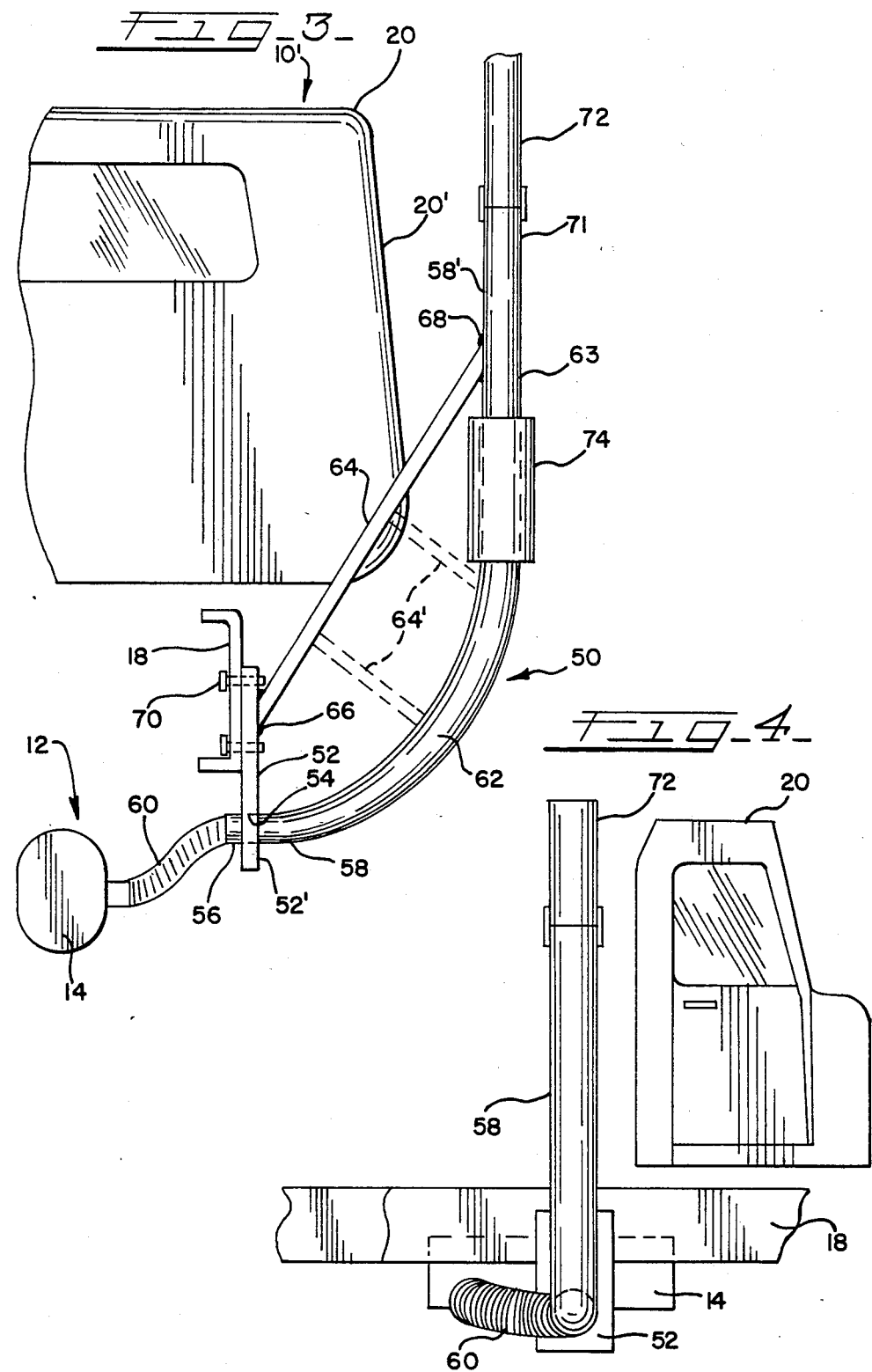

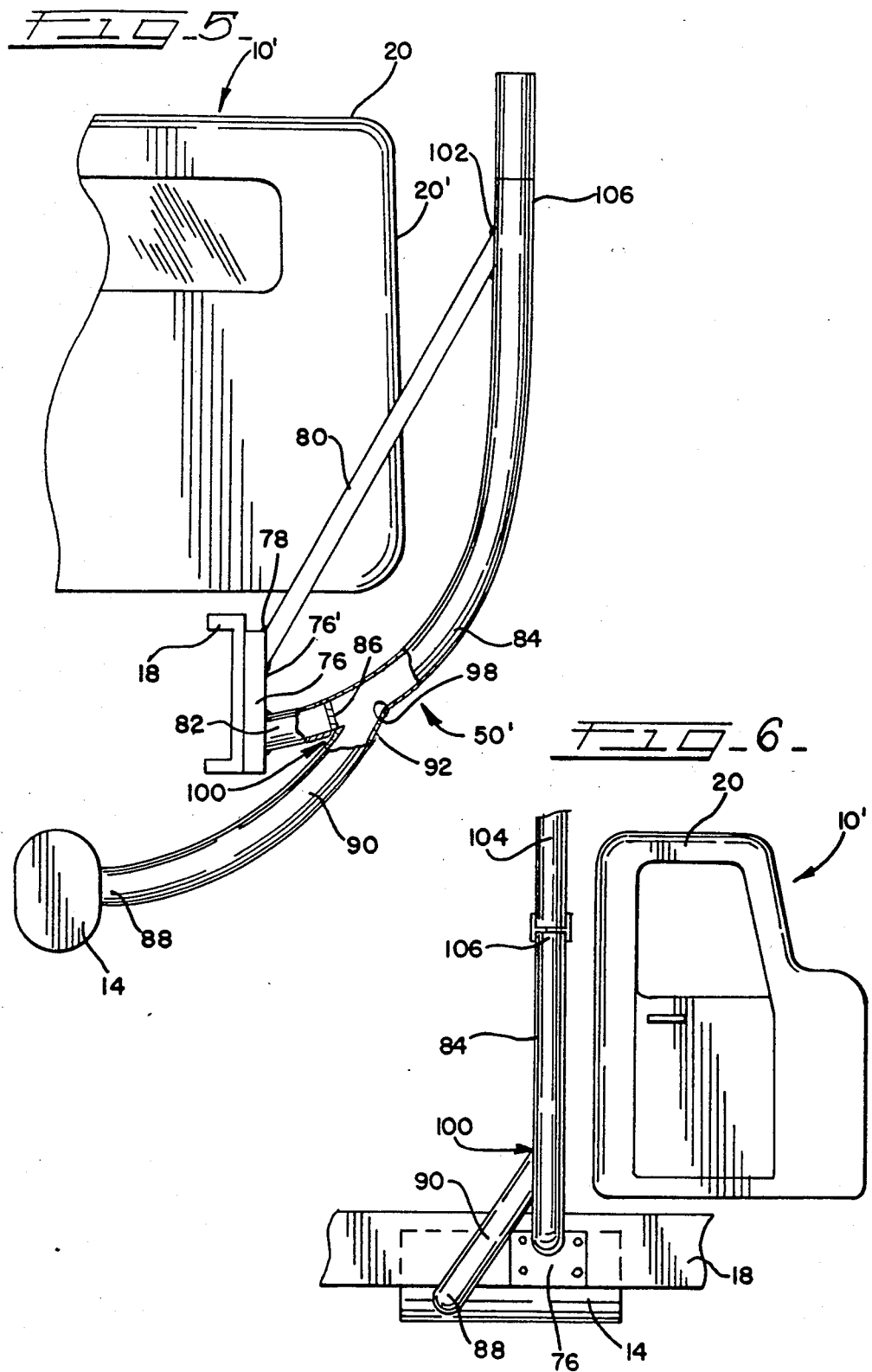

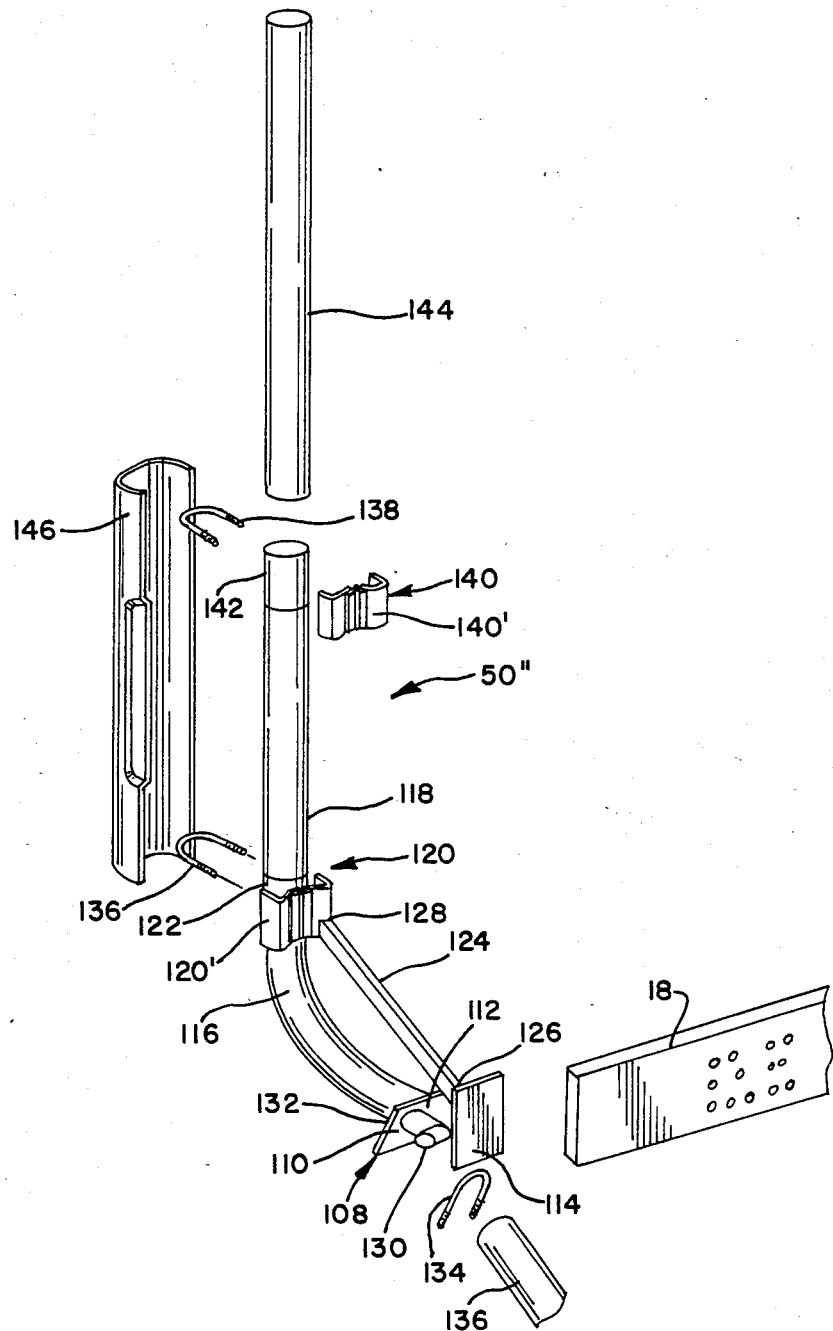

INTEGRAL EXHAUST PIPE AND BRACKET FOR TRUCKS

This invention relates generally to exhaust systems for medium and heavy duty trucks and more particularly provides an integral exhaust pipe and bracket for mounting to said vehicle characterized in that the exhaust pipe functions as a structural member of the mounting assembly enabling reduction of the dynamic displacement (vibration) of the exhaust pipe under the operating conditions of the truck, requiring fewer parts and thus reducing the complexity of the exhaust system and of the mounting assembly therefor. The invention further improves fatigue life of the exhaust system and reduces the noise level within the truck cab.

BACKGROUND OF THE INVENTION

The exhaust systems of medium duty trucks include muffler means mounted generally horizontally in the vicinity of the engine, an elongate generally cylindrical exhaust pipe coupled to the muffler means for receiving the exhaust gases therefrom and a bracket assembly for mounting the exhaust pipe to the frame and/or directly to the cab so that the coupling is maintained and the principal length of the exhaust pipe extends vertically generally alongside the cab of the truck. The weight of the exhaust pipe was supported by the mounting bracket assembly with the exhaust pipe itself being a dead weight thereupon. If the exhaust pipe is mounted directly on the cab, noise within the cab as well as structural damage to the cab can result. If mounted to the frame, the bracket was required to be somewhat massive, needing much bracing and, in some instances, substantial banding and/or clamping. Normally, the connection between the muffler means and the exhaust pipe was flexible, making the mounting somewhat unstable. Yet another means for mounting the exhaust system includes mounting both the muffler and exhaust pipe in a vertical orientation, either 5 directly attached to the cab or mounted to a mounting bracket attached to the frame as above with a partially flexible conduit coupling the engine to the muffler. This type of mounting is common in heavy duty trucks.

THE PRIOR ART

The problems described above did not appear to find solution or even an approach to solution from the prior patented art. Some prior art patents of interest are:

| Roos | 2,429,732 | October 28, 1947 |
| Reddekoop | 3,907,057 | September 23, 1947 |
| Witt | 3,908,368 | September 30, 1975 |
| Matsumoto et al | 4,060,143 | November 29, 1977 |
| Trautman | 4,378,945 | April 5, 1983 | which respectively fail to disclose any means for mounting the exhaust pipe of exhaust systems such as employed on medium or heavy duty trucks so that the exhaust pipe functions as a structural support rather than constituting only a member which must be totally supported by the mounting bracket. Roos provides a system and apparatus for operating submerged internal combustion engines and, therein, illustrates one typical installation of an exhaust pipe secured in substantially vertical orientation banded to a portion of the frame and cowl of a vehicle by clamps or similar devices and not contributing to its own support. The Reddekopp patent employs a baffled muffler which serves a structural support function for a cab guard but not for the exhaust pipes. The exhaust pipes are arranged vertically, do not provide any structural function, U-bolts being arranged to secure the pipes to the cab guard, the entire weight of the pipes being borne by the muffler itself. Witt provides a rigid connection between a vertically oriented conduit and the upper wall of an enclosure which surrounds an internal combustion engine, said wall bearing the weight of said conduit. Matsumoto et al provides a platform or base to which the muffler itself is fixedly secured. The exhaust pipe is connected with the muffler and is oriented vertically relative thereto, the exhaust pipe being a dead weight relative to the base. The base is supported by a pair of L-shaped supporting levers, the levers being secured to brackets carried by a cross-bar of the vehicle body and supported thereby for pivotal movement. The muffler as well as the exhaust pipe comprises a static load, said muffler being carried by said levers and is capable of up and down movement about each pivot to absorb the vibrations of the vehicle body and the engine body. Trautman, on the other hand, discloses a vertically oriented elongate air intake pipe having a horizontally oriented portion and a vertically oriented portion, each mounted to the cab of a cab/over/engine truck by mounting brackets weldably secured thereto. The weight of said air intake pipe is a dead weight supported by the mounting, the pipe itself contributing nothing to such support.

SUMMARY OF THE INVENTION:

The invention provides an integral exhaust pipe and mounting bracket comprising a relatively stiff tubular member one end of which is coupled to the muffler of the exhaust system of a medium to heavy truck which includes a structural framework. A mounting plate is permanently secured to said one end and mounted to the structural framework of the truck, such as the frame or frame rail thereof. The opposite end of the exhaust pipe is oriented generally vertically along the wall of the truck cab but not connected or otherwise mounted thereto. A lateral brace bridges the mounting plate and the opposite end of the exhaust pipe and is secured thereto by bolting, clamping or welding. Tubular extensions can be mounted on said opposite end to complete the exhaust system. The exhaust pipe, mounting plate and lateral brace complete the integral mounting system with the exhaust pipe being utilized as a structural member instead of being a nonstructural mass attached to a bracket and supported as a dead weight thereon.

BRIEF DESCRIPTION OF THE DRAWINGS

FIG. 3 is a fragmentary rear elevational view of a truck illustrating the integral exhaust pipe and mounting bracket according to the invention and showing same mounted to the truck frame with the exhaust pipe oriented vertically alongside the cab yet without connection thereto;

FIG. 4 is a fragmentary side elevational view of the truck illustrated in FIG. 3;

FIG. 5 is a fragmentary rear elevational view of a truck illustrating a modified form of the invention installed thereon;

FIG. 6 is a fragmentary side elevational view of the truck illustrated in FIG. 5; and, FIG. 7 is an exploded view of a further modified form of the invention.

DESCRIPTION OF PREFERRED EMBODIMENTS

Figure 1:
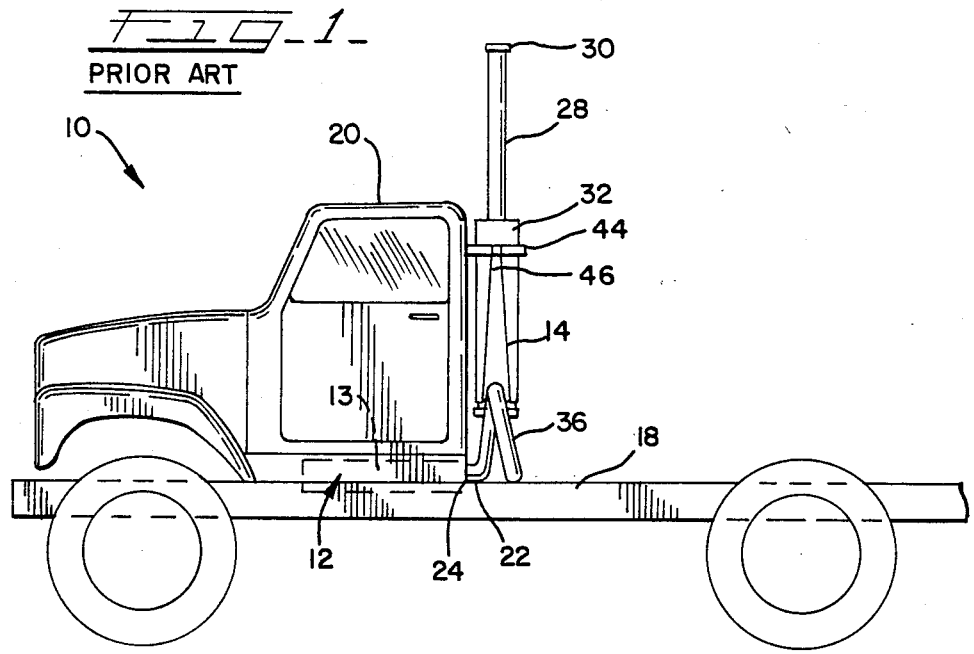
FIG. 1 is a side elevational view of a truck illustrating a prior art means for mounting the exhaust pipe thereto.
Figure 2:
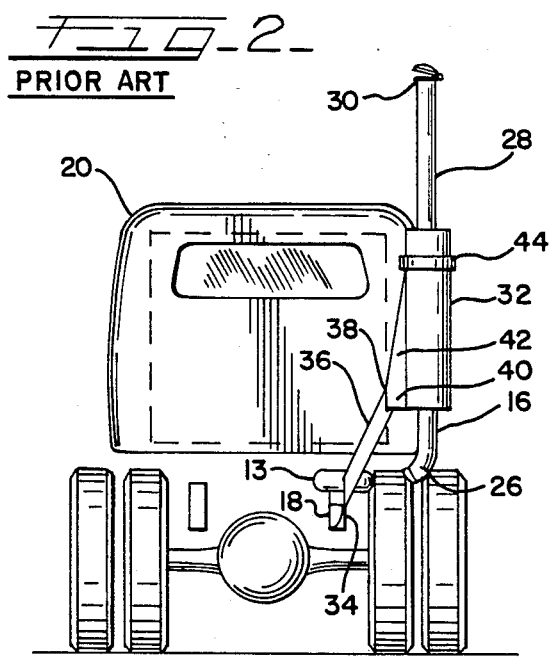
FIG. 2 is a fragmentary rear elevational view of the truck illustrated in FIG. 1.

A medium or heavy duty truck is illustrated in FIGS. 1 and 2 and designated by reference character 10. The truck 10 is represented as carrying an exhaust system 12 including a muffler 13, a separate mounting bracket assembly 14 and an exhaust pipe 16 mounted rigidly to the mounting bracket assembly 14 and secured thereby to the structural framework of the truck 10, such as the frame rail 18 of the truck 10 with the exhaust pipe 16 oriented vertically along a wall of the truck cab 20. One end 22 of the exhaust pipe 16 is coupled to the muffler outlet 24. The exhaust pipe 16 continues via an elbow 26 to terminate in a vertically oriented portion 28 having a free end 30. The exhaust pipe 16 may extend through a cylindrical jacket or guard 32 and terminates above the cab 20.

The mounting bracket assembly 14, according to the prior art, includes a plate 34 which is secured, as by bolts, directly to the frame rail 18. A rigid bar 36 is secured to the plate 34 and extends upwardly at an acute angle to said plate 34. The free end 38 of the bar 36 is fixedly secured to one end 40 of a tapered plate 42. The tapered plate 42 extends upward alongside the guard 32 in a direction parallel to the axis thereof and is coupled thereto by the ring clamp 44 at its thinner, upper end 46. The bracket assembly 14 is massive so that it is sufficiently strong to carry the static weight of the exhaust pipe 16 and maintain its rigidity whereby to reduce its dynamic displacement due to engine and truck body vibrations. The required clearance gap from the cab 20 is substantial.

Referring now to FIGS. 3 and 4, the integral exhaust pipe and mounting bracket assembly 50 according to the invention is illustrated as mounted to the frame rail 18 of a truck 10' carrying an exhaust system 12, including muffler 14. The pipe and bracket assembly 50 is formed of a planar plate 52 having a passage 54 through which is passed one end 56 of an elongate, curved, heavy walled generally rigid tube 58. The tube 58 is secured to the plate 52 preferably by welding same thereto and adjacent end 56. A flexible tube 60 joins end 56 of tube 58 to the muffler 14 for receiving exhaust gases from the truck engine (not shown). The tube 58 continues through its curvilinear portion 62 to a vertically oriented portion 63 which extends generally parallel to the wall 20' of the cab 20. Lateral brace 64 of generally rectangular cross-sectional configuration is secured at one end 66 to the plate 52 as by bolting, clamping or welding and is secured to the tube 58 at opposite end 68, also as by bolting, clamping or welding. The opposite ends 66 and 68 are cut on a diagonal bias so that parallel diagonal planes are defined, whereby to enable a mating surface with the plate surface 52' and the tube circumferential surface 58' respectively. Thus the plate 52, tube 58 and brace 64 are formed into an integral exhaust pipe assembly 50. The assembly 50 is mounted to the frame rail 18 in surface to surface engagement by fastening means, such as bolts 70. The tube 58 functions as the exhaust pipe of the exhaust system 12 and may carry a tubular extension 72, preferably having a thinner wall, clamped to its free end 71 to extend above the cab 20. A resonator 74 or a resonator and guard (not shown) can be accommodated along the length of the tube 58 but are optional. Optionally, auxiliary braces 64' may be employed leading from locations between the ends 66 and 68 of brace 64 to the curvilinear portion 62 of pipe 58 and secured thereto, as shown in broken line representation in FIG. 3.

A modified embodiment of the invention in the form of integral exhaust pipe and mounting bracket assembly 50', illustrated in FIGS. 5 and 6 as installed on truck 10'. The bracket assembly 50' includes a flat plate 76 having a planar surface 76' to which end 78 of lateral brace member 80 is secured permanently as by bolting, clamping or welding. One end 82 of curved heavy walled hollow tube 84 is secured preferably by welding to surface 76' of plate 76, said end 82 carrying an interior baffle 86 so as to prevent water, soot and other foreign matter from entering therein. One end 88 of a flexible tube 90 is coupled to the muffler 14 of the exhaust system 12' while the opposite end 92 of said flexible tube 90 is clamped or welded to the heavy walled tube 84 and provides interior communication through the wall thereof at a location 98 spaced from the baffle 86 to define a "Y" connection represented by reference character 100.

The upper end 102 of lateral brace 80 is welded, bolted or clamped to the upper end 106 of tube 84 completing the integral exhaust pipe and mounting bracket assembly. Suitable thin walled extension tubes 104 may be clamped to the free upper end 106 of said tube 84 to bring the outlet of said exhaust pipe above the level of the top of the cab 20.

Referring now to FIG. 7, a further modified embodiment of the invention is designated by reference character 50" and comprises an angular bent plate 108 having planar portions 110 and 112, a generally vertically oriented plate 114, a length of curved, heavy wall tubing 116, and upstanding exhaust pipe 118, a clamp joint 120 connecting the upwardly directed end 122 of tubing 116 and the pipe 118 and a lateral brace 124 having opposite ends 126 and 128 thereof welded or bolted to the plate 114 and to the clamp 120' respectively. The lower end 130 of tubing 116 is passed through opening 132 formed in portion 110 of bent plate 108 and welded in place, permanently secured therethrough. A U-bolt 134 is employed to clamp the flexible pipe 136 to the open lower end 130 of tubing 116. The U-bolt 135 is employed to establish the clamp joint 120 with the clamp 120' The exhaust pipe 118 preferably will have a standard wall conventional with exhaust pipes but which is thinner than the heavy wall forming the tubing 116. A U-bolt 138 is employed to secure clamp 140' onto the upper end 142 of said pipe 118 and establish clamp joint 140 with the standard upper tailpipe 144. A guard member 146 may be secured in place by the clamps 120' and 140'. The upstanding portion 114 of bent plate 108 is secured to a part of the framework of the truck, such as the frame rail 18', thus securing the integral exhaust pipe and bracket 50" in place installed on the truck. In this example, the dimensions of the muffler may be such as to interfere with the attachment of the mounting bracket 50" to the structural framework, such as the frame rail 18' of the truck. Other elements may likewise so interfere due to their location or dimensions. Accordingly, the bent plate 108 functions as an intermediate connector between the mounting bracket and the structural framework of the truck in lieu of a direct bracket connection with the truck frame rail, for example, thus securing the integral exhaust pipe and bracket 50" in place installed on the truck.

It should be appreciated that other modifications may be made to the invention by those skilled in the art without departing from the spirit and scope of the invention as determined by the claims appended hereto. For example, the cross-section of the brace members 64, 80, or 124 need not be rectangular. The mounting plate may be secured to the frame rail of the truck by bolts as an alternative to welding and forming a permanent connection. The brace 124 could extend to the upper clamp 140 rather than the lower clamp. Accordingly, it is intended to cover all such modifications and alternatives as may fall within the scope of the appended claims.

I claim:

1. In an exhaust system for trucks having a cab and a structural framework including a frame, the exhaust system further including a muffler, an exhaust pipe arranged to be coupled to the muffler, a mounting assembly for mounting said exhaust pipe to the structural framework in Coupled condition with the muffler comprising an elongate hollow integral exhaust pipe having opposite ends and an intermediate curved portion, a generally planar mounting plate, means for fixedly securing said mounting plate to said structural framework, one of said exhaust pipe ends being blind and fixedly secured to said plate, and means communicatively coupling said muffler to the pipe at a connection thereto adjacent said blind end of said pipe, said communicatively coupling means comprising a flexible tube having opposite ends, one end of said tube coupled to the muffler and the opposite end of said tube secured to said exhaust pipe, the other of said pipe ends opening freely, and a brace member having one end fixedly secured to said plate and an opposite end fixedly secured to said pipe.

2. The structure as claimed in claim 1 and baffle means disposed in the interior of said exhaust pipe adjacent the blind end side of the connection of said communicatively coupling means to said exhaust pipe.

3. In an exhaust system for trucks having a cab and a structural framework including a frame, the exhaust system further including a muffler, an exhaust pipe arranged to be coupled to the muffler, a mounting assembly for mounting said exhaust pipe to the structural framework in coupled condition with the muffler comprising an elongate hollow integral exhaust pipe having opposite open ends and an intermediate curved portion, a generally planar mounting plate, means for fixedly securing said mounting plate to said structural framework, one of said exhaust pipe ends being fixedly secured to said plate, and means communicatively coupling said one end of said pipe to the muffler, the other of said pipe ends opening freely and a brace member having one end fixedly secured to said plate and an opposite end fixedly secured to said pipe.

4. The structure as claimed in claim 3 in which said plate has a passage formed therein and said one end of said pipe extends through said passage, and said communicatively coupling means comprise a flexible pipe linking said muffler and said one end of said pipe.

5. The structure as claimed in claim 1 in which said exhaust pipe is of generally cylindrical cross-section, the axial direction thereof being generally horizontal at said one end of said pipe and vertical at said opposite end of said pipe.

6. The structure as claimed in claim 5 in which said brace member is oriented diagonally between said plate and said opposite end of said exhaust pipe.

7. The structure as claimed in claim 1 in which said plate is secured to the frame of said structural framework.

8. The structure as claimed in claim 1 in which said one end of said pipe is welded to said plate and said one end of said brace member is welded to said plate.

9. A mounting assembly for an exhaust pipe of a generally heavy duty truck exhaust system comprising a planar plate adapted to be fixedly secured to a framework of said truck, an integral hollow elongate tube having a first end secured to said plate, and a curvilinear section extending to an opposite end, and a diagonally oriented brace member having opposite ends secured respectively to said plate and to said tube adjacent said opposite end of said tube, said tube functioning as a supporting member of said mounting assembly.

10. The mounting assembly as claimed in claim 9 in which the exhaust system includes a muffler and said first end of said tube is permanently secured to said plate with said first end passing through said plate to an open end adapted to receive communicative coupling means associated with said muffler.

11. The mounting assembly as claimed in claim 10 in which there are auxiliary brace means secured between said brace member and said tube.

12. The mounting assembly as claimed in claim 9 in which the exhaust system includes a muffler and said first end of said tube is blind and connected permanently to said plate, baffle means disposed in the interior of said tube located spaced from said blind end and a passage formed in said tube between said baffle means and said opposite end of said tube and a flexible pipe having one end adapted to be coupled to the muffler and an opposite end permanently secured to said tube in a Y-connection to said passage.

13. The mounting assembly as claimed in claim 9 in which there are auxiliary brace means secured between said brace member and said tube.

14. The mounting assembly as claimed in claim 9 in which there is an intermediate linking structure between said tube and said planar plate member, said tube being permanently secured to said intermediate linking structure.

15. An integral exhaust pipe and mounting bracket in combination with an engine exhaust system of trucks which have a structural framework, said mounting bracket comprising an angular heavy walled tube having open upper and lower ends, a plate member, laterally disposed brace means secured to the upper end of the tube and to the plate member bridging same and fastening means securing said plate member to the framework of the truck, the upper end of the tube being free standing oriented generally vertically, said tube and plate member being secured together and the lower end of the tube being coupled to the engine exhaust system.

16. The mounting bracket as claimed in claim 15 and tubular extension means mounted to the upper end of said tube for delivering the engine exhaust for atmospheric release at a location above the truck and clamp means for securing said extension means and upper end of said tube one to the other.

17. The mounting bracket as claimed in claim 16 in which said extension means comprise an upper tailpipe having a wall thinner than a wall of said tube.

18. The mounting bracket as claimed in claim 15 in which the lower end of said tube abuts said plate and is joined thereto, an access opening formed in said tube adjacent the lower end thereof and a flexible exhaust tube secured to said opening and effecting a coupling between said tube and the muffler.

19. The mounting bracket as claimed in claim 18 and baffle means disposed within said tube between said access opening and said plate.

20. The mounting bracket as claimed in claim 15 and an intermediate angular bent member is disposed between said plate and said tube, said angular bent member including a planar portion arranged generally normal relative to said plate and permanently secured thereto along one edge and an angular bent portion joined to said planar portion along a fold located opposite said one edge, an opening formed in said angle portion for receiving the lower end of said tube therethrough, said lower end of said tube being permanently secured thereto and a flexible exhaust pipe effecting the coupling between the said lower end and the muffler.

21. The mounting bracket as claimed in claim 15 in which a resonator is disposed between the upper and lower ends of said tube.

22. The mounting bracket as claimed in claim 15 and said lateral brace means is permanently secured between said plate and said tube and said tube is permanently secured to said plate member.

23. The mounting bracket as claimed in claim 22 in which an auxiliary brace means is permanently joined to said lateral brace means and said tube.

24. The mounting bracket as claimed in claim 15 in which the lower end of said tube is oriented generally horizontally and the upper end of said tube is oriented generally vertically.

25. The mounting bracket as claimed in claim 15 in which said tube functions as a structural component of said mounting bracket.

26. The mounting bracket as claimed in claim 15 and fastening means to secure said plate member to said structural framework.

* * * * *